(12) United States Patent
Nilsen et al.

(10) Patent No.: US 6,770,225 B2
(45) Date of Patent: *Aug. 3, 2004

(54) TEXTURED RETROREFLECTIVE PRISM STRUCTURES AND MOLDS FOR FORMING SAME

(75) Inventors: Robert B. Nilsen, Weatoque, CT (US); Christopher Alan Barnett, Gwent (GB); Nicholas John Phillips, Loughborough (GB)

(73) Assignee: Reflexite Corporation, Avon, CT (US)

( * ) Notice: Subject to any disclaimer, the term of this patent is extended or adjusted under 35 U.S.C. 154(b) by 362 days.

This patent is subject to a terminal disclaimer.

(21) Appl. No.: 09/901,199

(22) Filed: Jul. 9, 2001

(65) Prior Publication Data

US 2001/0048169 A1 Dec. 6, 2001

Related U.S. Application Data

(63) Continuation of application No. 08/883,329, filed on Jun. 25, 1997, now Pat. No. 6,258,443, and a continuation-in-part of application No. 08/766,238, filed on Dec. 13, 1996, now abandoned, which is a continuation-in-part of application No. 08/702,245, filed on Aug. 28, 1996, now Pat. No. 5,840,406, which is a continuation of application No. 08/410,864, filed on Mar. 27, 1995, now abandoned, and a continuation-in-part of application No. 08/314,487, filed on Sep. 28, 1994, now Pat. No. 5,565,151.

(51) Int. Cl.[7] ............................................. B29D 11/00
(52) U.S. Cl. ........................ 264/1.9; 264/2.5; 264/219
(58) Field of Search ........................ 264/1.9, 2.5, 2.7, 264/219

(56) References Cited

U.S. PATENT DOCUMENTS 2,073,300 A    3/1937   Frederick et al. .............. 88/82

(List continued on next page.)

FOREIGN PATENT DOCUMENTS

| EP | 0 137 736 A2 | 4/1985 |
| EP | 0 390 344 A2 | 10/1990 |
| GB | 243797 A | 12/1925 |
| GB | 270 790 A | 5/1927 |
| GB | 1 476 447 | 6/1977 |
| WO | WO 95/03558 | 2/1995 |
| WO | WO 96/30786 | 10/1996 |
| WO | WO 96/36891 | 11/1996 |

OTHER PUBLICATIONS

Patent Abstracts of Japan, vol. 095, No. 003, Apr. 28, 1995 & JP 06347621 A (Nippon Carbide Ind. Co., Inc.), Dec. 22, 1994.

Horibe, A., et al., "Proposal of Highly Scattered Optical–Transmission Polymer, " 5 pages.

Rityn, N.E., "Optics of Corner Cube Reflectors," *Sov. J. Opt. Tech.*, 34:198–201 (1967).

Eckhardt, H.D., "Simple Model of Corner Reflector Phenomena," *Applied Optics*, 10(7):1559–1566 91971).

*Primary Examiner*—Mathieu D. Vargot
(74) *Attorney, Agent, or Firm*—Hamilton, Brook, Smith & Reynolds, P.C.

(57) ABSTRACT

Retroreflective prism sheeting is formed in a mold with textured facets and/or windows thereon. Smaller prisms are formed adjacent larger prisms. Optionally, the optical axis of the prisms may be tilted with respect to one another, preferably in a negative direction. The textured facets or windows provide more uniform retroreflected light intensity distribution and whiteness of the sheeting.

16 Claims, 10 Drawing Sheets

U.S. PATENT DOCUMENTS

| | | | |
|---|---|---|---|
| 2,213,023 A | 8/1940 | Beck, et al. | 88/82 |
| 2,310,790 A | 2/1943 | Jungersen | 88/105 |
| 2,380,447 A | 7/1945 | Jungersen | 88/78 |
| 3,357,772 A | 12/1967 | Rowland | 350/167 |
| 3,689,346 A | 9/1972 | Rowland | 156/245 |
| 3,712,706 A | 1/1973 | Stamm | 350/103 |
| 3,718,078 A | 2/1973 | Plummer | 95/49 |
| 3,873,184 A | 3/1975 | Heenan | 350/103 |
| 4,202,600 A | 5/1980 | Burke et al. | 350/103 |
| 4,243,618 A | 1/1981 | Van Arnam | 264/1 |
| 4,244,683 A | 1/1981 | Rowland | 425/143 |
| 4,303,305 A | 12/1981 | Jones | 350/103 |
| 4,576,850 A | 3/1986 | Martens | 428/156 |
| 4,588,258 A | 5/1986 | Hoopman | 350/103 |
| 5,122,902 A | 6/1992 | Benson | 359/529 |
| 5,122,939 A | 6/1992 | Kazdan et al. | 362/243 |
| 5,171,624 A | 12/1992 | Walter | 428/156 |
| 5,565,151 A * | 10/1996 | Nilsen | 264/2.5 |
| 5,780,140 A | 7/1998 | Nilsen | 428/172 |
| 5,840,406 A | 11/1998 | Nilsen | 428/156 |
| 5,940,212 A * | 8/1999 | Johnson et al. | |
| 6,206,525 B1 | 3/2001 | Rowland et al. | 359/530 |

* cited by examiner

Original nickel tool

Coat tool with layer of photoresist

Random exposure of photoresist to a speckle pattern

Development of resist

Reactive ion-etching to produce modified mold body

Cast of original tool

Coat cast with layer of photoresist

Random exposure of photoresist to a speckle pattern

Development of resist

Electroform with nickel to create a new indenting tool

Removing the cast to reveal the new nickel indenting tool

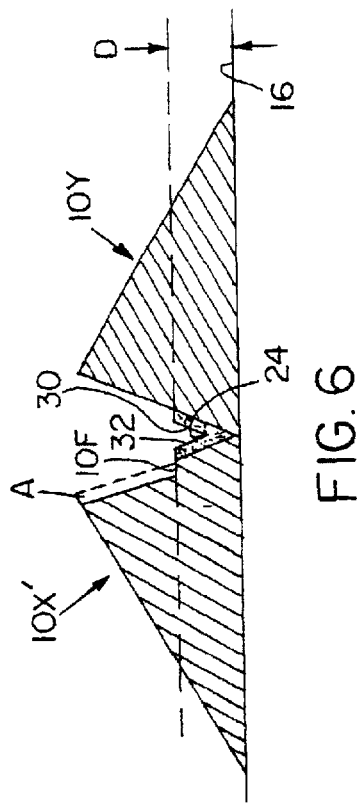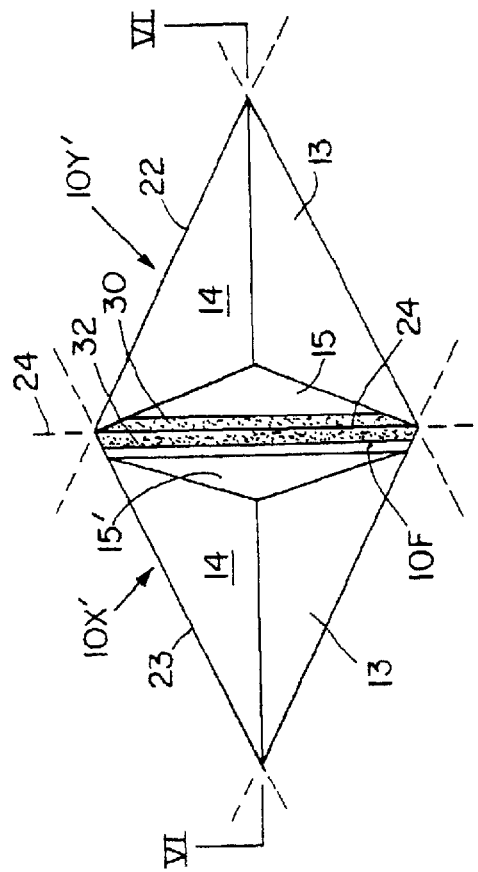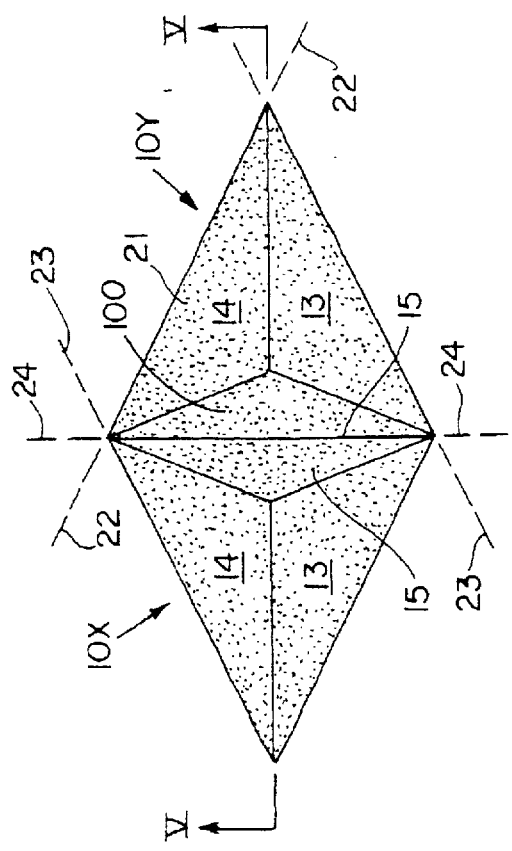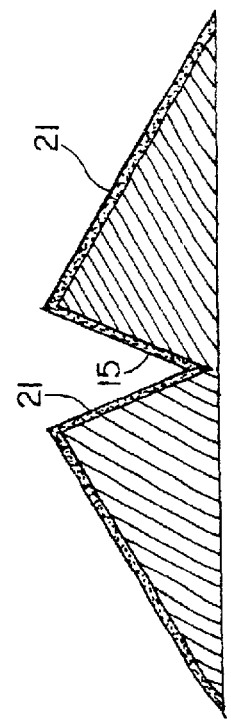

480mJ/cm²

497mJ/cm²

514mJ/cm²

533mJ/cm²

554mJ/cm²

576mJ/cm²

US 6,770,225 B2

TEXTURED RETROREFLECTIVE PRISM STRUCTURES AND MOLDS FOR FORMING SAME

RELATED APPLICATIONS

This application is a Continuation of U.S. application Ser. No. 08/883,329 filed Jun. 25, 1997, now U.S. Pat. No. 6,258,443, which is a Continuation-in-Part of U.S. application Ser. No. 08/702,245 filed Aug. 28, 1996, now U.S. Pat. No. 5,840,406, and U.S. application Ser. No. 08/314,487 filed Sep. 28, 1994, now U.S. Pat. No. 5,565,151 issued Oct. 15, 1996, and U.S. application Ser. No. 08/766,238, filed Dec. 13, 1996, now abandoned, which is a file wrapper continuation of U.S. application Ser. No. 08/410,864 filed Mar. 27, 1995, now abandoned, each of which is incorporated herein in its entirety by reference.

BACKGROUND OF THE INVENTION

Retroreflective structures of the type utilized herein are described in detail in Jungersen, U.S. Pat. No. 2,380,447, issued Jul. 31, 1945, Hoopman, U.S. Pat. No. 4,588,258, issued May 13, 1986, and Stamm, U.S. Pat. No. 3,712,706, issued Jan. 23, 1973 (each of which is incorporated herein in its entirety by reference.)

Walter, U.S. Pat. No. 5,171,624 discloses microprism reflective sheeting in which prism pairs are tilted with respect to one another at an angle of 3–10°, a prism size of 0.006–0.025 (space between apices) and wherein at least one prism side surface is arcuate.

Benson, U.S. Pat. No. 5,122,902 discloses retroreflective cube-corner elements with separation surfaces between elements and truncated cube-corner elements.

Conventional retroreflecting prism or corner cube arrays of the type described in U.S. Pat. No. 5,171,624 (incorporated herein by reference in its entirety) create a diffraction pattern having a characteristic void outside of a central maxima and a six lobed light energy distribution. The six lobes of energy formed about the central maxima represent the energy cones of the first order of diffraction. Such an energy distribution is undesirable because of the high degree of variation of energy level throughout the retroreflected beam.

SUMMARY OF THE INVENTION

The above-referenced patent, U.S. Pat. No. 5,565,151, discloses retroreflective prism sheeting comprising an array of closely spaced prisms in which a window is formed in at least one of the facets of a prism in a prism pair.

The windows are formed by casting the prisms in a mold in which a section of the prism element mold is removed.

Removing a section of one of the prism elements creates a smaller prism which produces increased observation angle performance. Good observation angle performance is especially important for retroreflecting objects viewed by trucks or airplanes where the source of light is spaced a further distance from the driver than an automobile. Such improved performance is also important for automobile drivers when the driver is very close to the retroreflecting object.

In accordance with the present invention, the prism facets and/or the windows as formed in a mold are textured so as to provide light scattering of the incident light in certain areas which greatly enhance the whiteness (CAP Y) of the retroreflective film. Enhanced whiteness increases the conspicuity of the film; a property highly desired in daytime and nighttime viewing of objects. The texturing is in the form of a random speckled pattern of sufficiently small texture as compared to the prism aperture to cause light retroreflected from the prism facets to be deviated or scattered slightly, resulting in a more uniform energy distribution of the retroreflected light and wider observation angle performance.

In accordance with another embodiment of the present invention, a prism tool or mold is provided having indentations or projections formed on the mold facets or windows for texturing the prisms, as made or formed in the mold.

BRIEF DESCRIPTION OF THE DRAWINGS

FIG. 4 is a plan view of a single pair 10C/10B of prism mold elements in which a speckled or textured pattern has been etched into the entire plan surface of a mold of the invention.

FIG. 5 is a side-view of the prism element mold of FIG. 4 taken along lines V—V of FIG. 4.

FIG. 6 is a side view of the next step in the mold fabrication.

FIG. 7 is a plan view of FIG. 6.

DETAILED DESCRIPTION OF THE INVENTION

A description of preferred embodiments of the invention follows.

In accordance with the present invention, retroreflective prism sheeting is formed by casting or otherwise forming an array of prisms on a prism mold (sometimes referred to as a "tool") which has been modified so as to disrupt or texture the casting surface of the mold sufficiently to cause light, incident on the prism facets or windows, to be scattered. Prior art retroreflective structures have dark areas (absence of light areas) present in the retroreflected light pattern. The dark areas are caused by diffraction of the incident light. The scattering texture formed on the retroreflective prism surfaces produces a light pattern composed of patterns due to the scattered light superimposed on the original unscattered light pattern. The relative strength of the patterns caused by the scattered light will be dependent on the nature of the reflective surfaces.

Figure 1A:
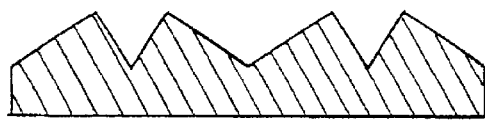
FIGS. 1A–1E are a series of side views of a portion of a master mold for forming an array of textured microprism sheeting illustrating five significant steps in forming such a mold in accordance with the invention.
Figure 1B:
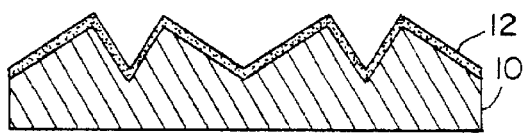
Figure 1C:
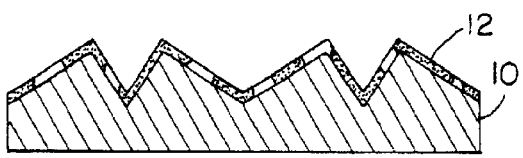
Figure 1D:
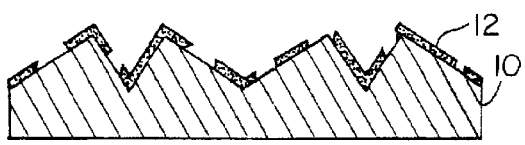

One method of forming the necessary tooling for fabricating textured prism arrays in accordance with the invention is shown in FIGS. 1A–1E. In this instance (FIG. 1A), a tool 10 or mold of suitable material, such as nickel, is first dip-coated with photoresist 12 to form a resist layer of approximately 0.5 $\mu$m (FIG. 1B). Preferably a Shipley AZ1350 positive resist is used which is readily available and the properties of which are well documented. Using a scanning technique (described later), the resist 12 is exposed to a random speckle light pattern, preferably using an argon-ion laser operating at 458 nm (FIG. 1C). The size of the speckle features required to produce the required dispersion of the reflected light is in the order of 10 micrometers to 1 micrometer in width and less than one wavelength in depth and preferably less than one-tenth of one wavelength.

Figure 1E:

Once developed (FIG. 1D), the profile of the resist may be smoothed out by heating the mold 10 prior to etching, preferably by reactive-ion techniques (FIG. 1E). This smoothing of the resist profile will somewhat reduce the scattering abilities of the surfaces of the eventual retroreflector.

Note: The size of the speckle features 14 in the figures is greatly exaggerated in the drawings and is not to scale.

The use of reactive-ion techniques to etch the surface of the tool in the step of FIG. 1E is preferable to wet chemical etching techniques, using an acid, which would leave the surface of the tool with a measurable roughness that would affect the scattering capabilities of the final retroreflector. The use of reactive-ion etching permits control over the scattering capabilities of the final product.

In coating tool 10 with a layer of resist, pools of resist may be created in the recesses of the tool due to the finite surface tension of the resist. Provided that the surface tension of the resist is sufficiently low, the formation of these pools should not create a problem since this translates to a slight blunting of the apexes in the final prism array, which do not substantially contribute to the retroreflective qualities of the finished product.

Figure 2A:
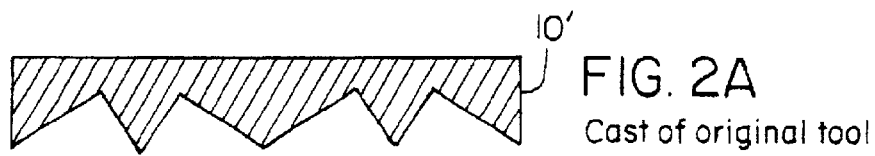
FIGS. 2A–2F are a series of steps illustrating formation of a master mold for molding textured microprism sheeting in an alternative embodiment of the invention.
Figure 2B:
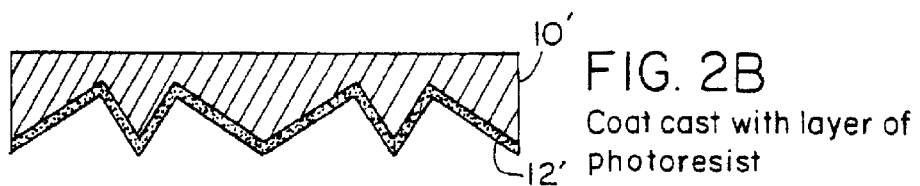
Figure 2C:
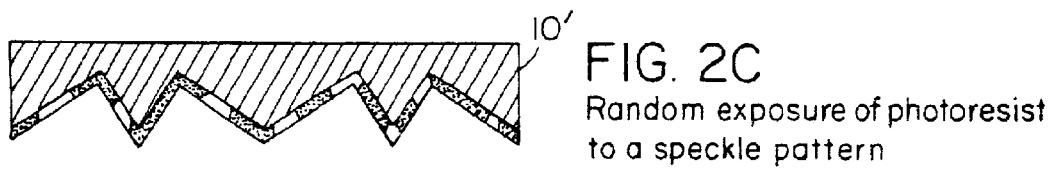
Figure 2D:
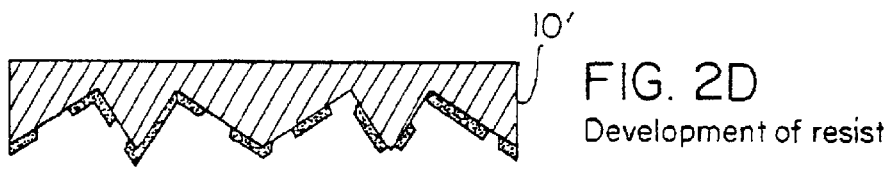
Figure 2E:
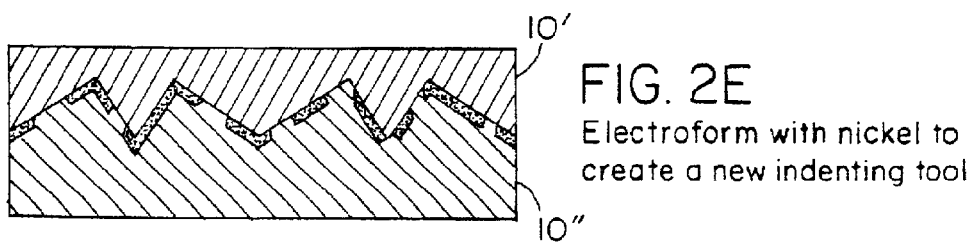
Figure 2F:
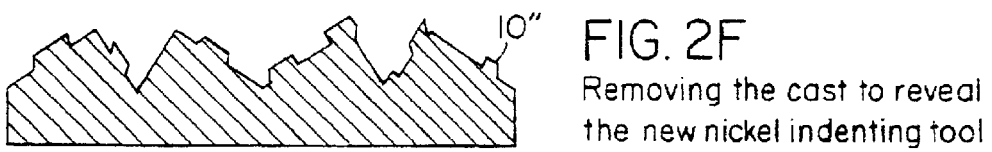

An alternate process embodiment is shown in FIGS. 2A–2F, wherein a metal indenting tool 10" is created by electroforming from a modified cast 10' of the original tool (FIG. 2A). First, a cast 10' is created of the original tool 10 (FIG. 1A) in a substrate that will support a photoresist of compatible material (FIG. 2A). Following a similar process to that outlined in FIGS. 1A–1E, the cast 10' is then coated with a layer of resist 12' (FIG. 2B) which is then exposed to the speckle pattern (FIG. 2C) before being developed (FIG. 2D). At this stage the cast 10' can be used to build a new metal indenting tool 10" by electroforming (FIG. 2E). Once the new tool 104 is formed, the cast 10' can be used to build a new metal indenting tool 10" by electroforming (FIG. 2E). Once the new tool 104 is formed, the cast 10' is then removed (FIG. 2F) to reveal the new indenting tool 10" which is similar to that shown in FIG. 1E.

Alternatively, a textured surface 21 can also be conveniently created on the tool of FIG. 1B by depositing onto the ruled or fly cut surface a matte or semi-bright metallic layer of the same or different chemical nature as the substrate. Metals such as copper, nickel, brass, gold, silver, etc. can be used for texturing a bright surface by electrodeposition. Electroless deposits of copper, nickel and various other metals can also be used for this purpose. Other deposition techniques such as chemical or physical vacuum deposition, sputtering, etc. can also be used for rendering a surface texture under appropriate deposition conditions.

By way of illustration, a copper electrodeposit can be plated out of a conventional acid copper sulfite bath, comprising (see Lowenheim, F. A., Modern Electroplating, Ed." John Wiley & Sons, p. 183 (1974)) an aqueous solution of copper sulfate and sulfuric acid. Various additives can be introduced in the composition to control the surface texture and other properties of the deposit. The process is usually carried out in a plating tank with the part made cathodic, using copper anodes as counter electrodes and an external DC power supply driving the deposition process. A deposit thickness as low as 0.5 micrometers could be sufficient to modify the original surface texture, however, higher deposit thicknesses may be beneficial if a coarser texture is required. Copper deposits formed in the acid sulfate bath have a pronounced coarse finish by virtue of a large grain size and random orientation of individual grains comprising the plated surface. Certain additives incorporated in the plating chemistry may improve the localized reflectivity of the surface by rendering the surface finish more reflective, yet retaining the random orientation of individual grains. Such deposits, known in the industry as "semi-bright," may further augment the desired effect of texturing by increasing the intensity and random scattering of the reflected light from the textured areas of prisms cast in such a mold.

Another alternative way of rendering a surface textured is by etching the ruled or fly cut surface as described in FIGS. 1A–E and FIGS. 2A–F. Various etching techniques can be used for this purpose. Chemical or electrochemical etching of the entire surface can be used in combination with the subsequently recutting of the desired bright surfaces. Mechanical texturing such as sandblasting can also be used in essentially the same manner as electro or electroless deposition or etching of the surface. As an illustration, a solution of nitric acid, either concentrated or diluted, can be used to etch the surface of a copper or brass master mold to achieve a textured surface. This process is carried out in a tank holding the acid solution by immersing the master mold into the solution for the necessary amount of time to obtain the desired surface texture, followed by a rinsing and drying step.

A process of controlled selective etching, such as, for instance, eximer laser etching, as opposed to etching the entire surface, can be implemented to etch only the desired areas of the master mold. Such an approach eliminates the need for the second fly cutting or ruling step after the surface has been textured, thus shortening the mastering cycle. This process is accomplished by focusing an eximer laser beam to the required spot size and etching the mold substrate. Proper alignment and straightness of travel of the laser source will ensure that only the window areas of the prism structure are etched.

Turning now to FIGS. 3–7, the details of fabrication of additional preferred embodiments of a mold 110 used to form the retroreflective sheeting of the invention will be described in connection therewith. Note: the term "sheeting" as used herein refers to relatively thin sheet-like structures as well as thicker members, laminates and the like, which have a substantially planar front face upon which light rays impinge and which have a body portion which is essentially transparent to the light rays.

Figure 3:
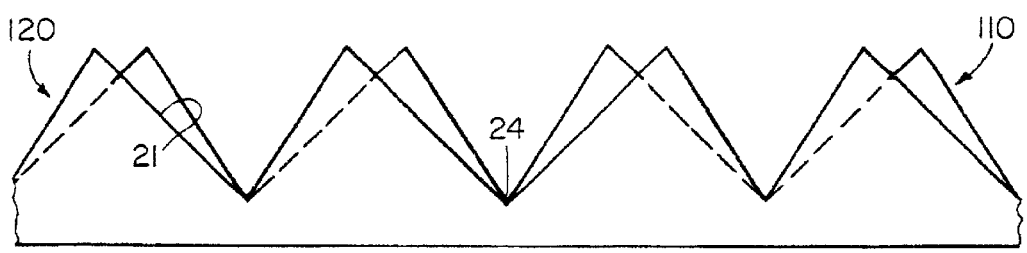
FIG. 3 is a section of a mold structure of the invention.

A mold structure 110 is shown in FIG. 3 in section, and a prism pair portion 100 of the mold is shown in plan view in FIG. 4. The mold 110 is created by first ruling or flycutting a master mold from suitable material, such as, brass or copper, in three directions spaced about 56° and 62° from one another (with appropriate groove angles) to form three sets of grooves 22, 23, 24 as shown in the plan view of FIG. 4. The mold prisms 10X and 10Y of the prism pair 100 each have three opposed dihedral faces or facets 13, 14 and 15 after the ruling or flycutting operation.

In the example shown in FIGS. 4 and 5, all the exposed surfaces of the mold 110 have been speckled by one of the previously described methods. Next, an area A of one of the prisms is removed in a second fly-cut operation. The area removed in the second pass creates a flat surface 10F (see FIG. 6) and a smaller corner cube retroreflector 10' when the sheeting 100 is formed in a mold. Note that the cut that produces face 15' (FIG. 7) forms a corner cube structure 10' which has two faces (13 and 14) which are larger than face 15'. The corner cube structure 10' created with modified face 15' has an effective aperture that is slightly skewed.

Also note that the window 10F which is created is not located in the base plane 16 of the corner cube 10' (see FIG. 6). That is, it is not bounded by the base edges of the lateral faces of the corner cube elements.

Also note that the flat area of face 10F is formed in a way which does not change the corner cube elements immediately adjacent. Corner cube 10Y is left undisturbed by the process of forming area face 10F. Optionally second passes are made through each of grooves 23 and 22 of sufficient depth to remove the texture 21 on each of the remaining facets 13 and 14 leaving an untextured window 10F with textured partial facet faces 30 and 32 located on either side of groove 24 as shown in FIG. 7.

Optionally, the optical axes (the trisector of an internal angle defined by the prism faces 13, 14 and 15) of the elements 10X and 10Y are tilted away from one another (negative tilt). The angle of tilt is preferably more than 1.0 degree and less than about 7.0 degrees with respect to a perpendicular extending from the common plane 16 in which the base edges of the cube corner approximate. Preferably the cube corner base width is formed on a common plane in which the base edges of the cube corner faces 13, 14 and 15 lie, and the width or size dimension is greater than 0.0005 inches and preferably less than 0.006 inches but may extend beyond 0.006 inches to about 0.025.

An array of clear plastic prisms may then be formed in the master mold, or an electroformed replica thereof which will have texturing 21 in the form of indentations or elevations depending upon whether a positive or negative of the master mold is used.

Figure 8:
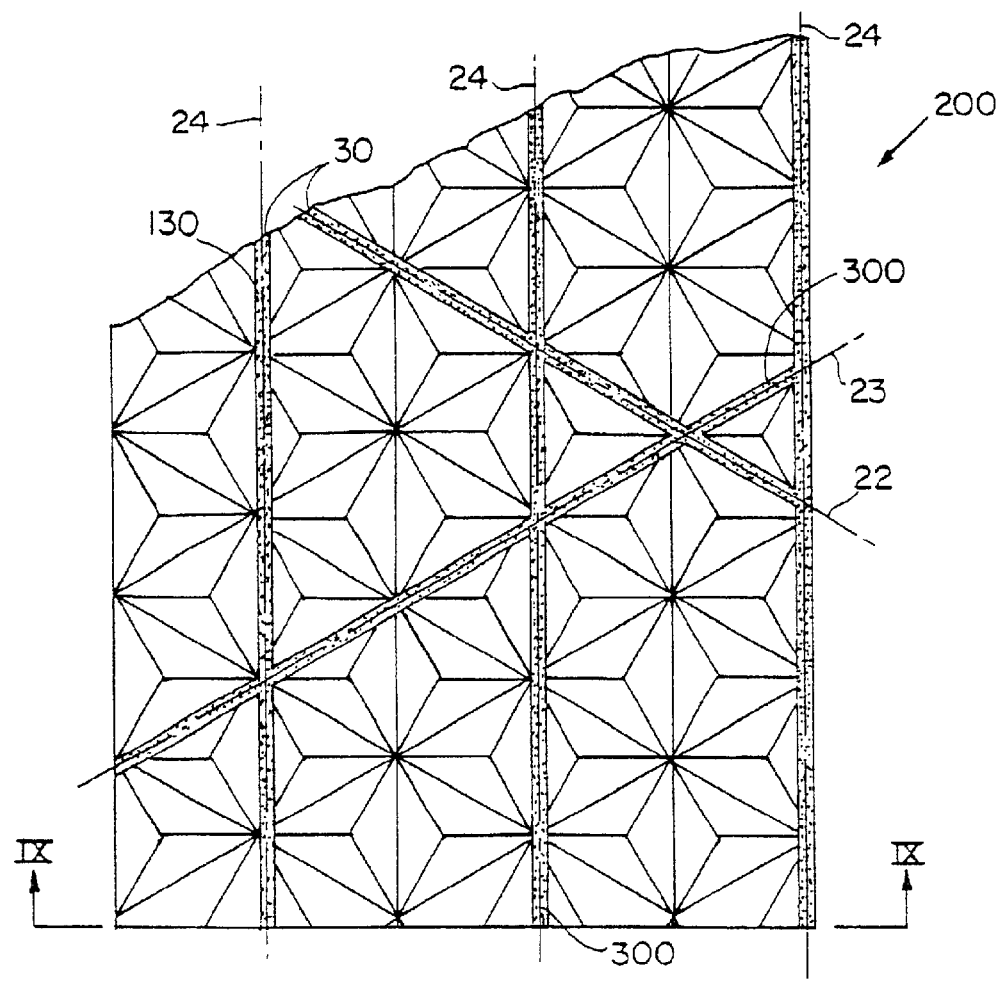
FIG. 8 is a plan view of an alternate embodiment of the retroreflective sheeting of the invention.
Figure 9:
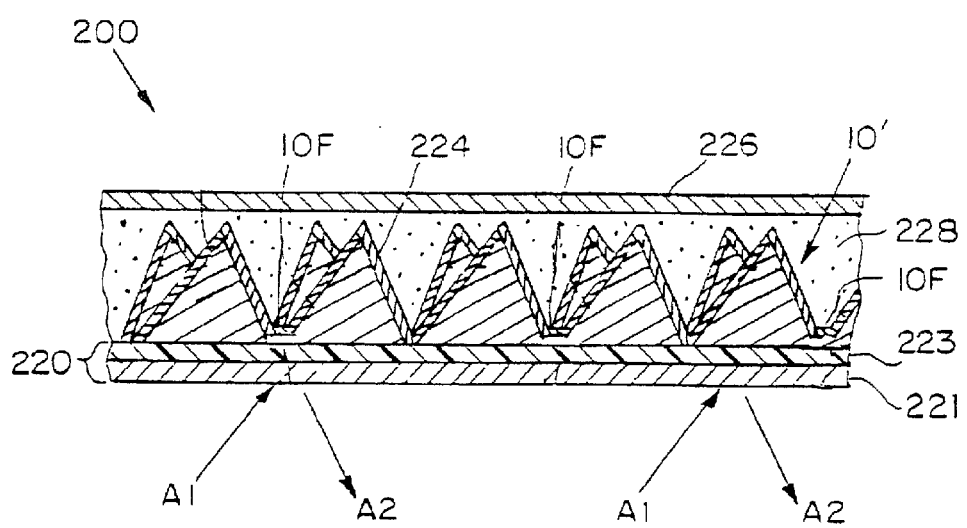
FIG. 9 is a side view of FIG. 8.

The micro-prism sheeting 180 embodiment of FIGS. 8 and 9, is made by casting prism material in a master mold which has been formed as previously described. All exposed faces are textured as also previously described. Then on a further fly cut-pass some of the dihedral faces are cut along grooves 22, 23, 24 down to a depth above the base line, leaving the texture 130 remaining only on certain selected intersections as shown in FIG. 8. Clear plastic prisms are then cast in the mold, or a replica thereof, as variously described in U.S. Pat. Nos. 3,684,348; 3,810,804; 3,811,983; 3,830,682 to William P. Rowland, each of which is incorporated in its entirety by reference herein. The texture 130 may be in the form of either random depressions or random bumps in the lower portion of the facets, either of which significantly enhance the whiteness values of the retroreflective sheeting, since they act as light scatterers of the light rays impinging on the sheeting 200 in the direction of arrows A1 and reflecting to the viewer in the direction A2 (see FIG. 9).

An example of the finished sheeting 200 is shown in more detail in the section of FIG. 9, wherein an array of prisms 10' are bonded onto a body portion 220 consisting of a transparent outer protective sheet or layer 221 and a land area 223. The prisms are formed in a mold as previously described with texture 130 formed on lower portions of intersecting facets or alternatively may be provided with texturing 130 over all facets of the prisms.

The body layer 221 typically functions to protect the sheeting from environmental elements and/or to provide significant mechanical integrity to the sheeting. In a preferred embodiment, the body layer 221 is the outermost layer on the front side of the sheeting 200. The land layer 223 is distinguished from the body layer 221 by being a layer disposed immediately adjacent to the base of the cube-corner elements, and the term "land layer" is used herein to mean such a layer.

Figure 10:
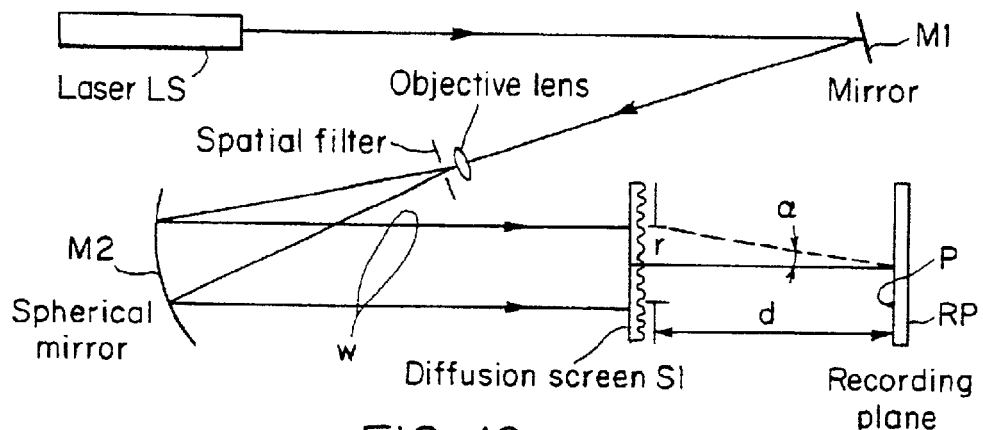
FIG. 10 is a schematic diagram of a method for recording a speckle pattern from a diffuse object.
Figure 11:
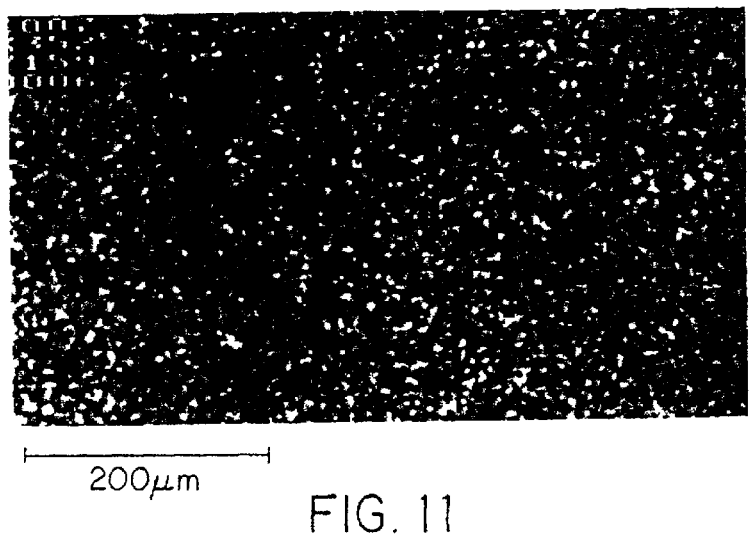
FIG. 11 is a copy of a photograph of a speckle pattern produced in accordance with FIG. 10.
Figure 19A:
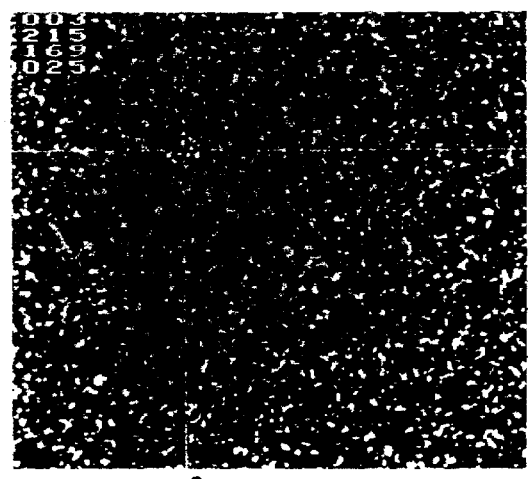
FIGS. 19A–F are copies of a set of photographs of speckle patterns at various exposure levels showing how exposure influences the speckle recording in photoresist.
Figure 19B:
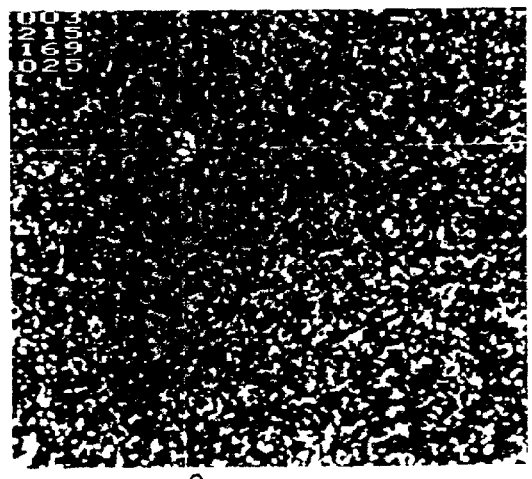

The prism array is preferably coated on the facet side with a metal reflective layer 224 and an adhesive 228 is used to bond the array to a protective backing 226. As described above in connection with FIGS. 1A–1E, it is possible to modify retroreflective properties of a corner-cube array by introducing random discontinuities into the surfaces of the individual prisms. One way to do this requires that the metal indenting tool or mold be initially coated in photoresist which is then exposed to a random intensity radiation field. After the development and selective removal of the resist the underlying tool is then etched to produce a tool which can form prism facets having diffuse properties in addition to strong retroreflective properties. One way in which the random intensity field, or "speckle pattern" can be created is generally described in the following manner:

Consider a ground-glass diffusion screen S1 transilluminated by a plane wave W of coherent laser light from a laser source LS and reflected off of flat mirror M1 to a spherical mirror M2 (FIG. 10). At the scattering surface of the screen S1, a random phase modulation is imposed on the incident plane wave W by the random diffuse properties of the screen S1. The screen can then be considered as comprising an array of scattering centers or point sources of varying phase. At some distance from the plane the amplitude, as well as the phase of the scattered light, will fluctuate as a random and complicated function caused by the interference of all the scattering centers. This is due to the interference of the coherent, but randomly directed, diffracted plane waves from the screen. A high resolution photographic plate P, e.g. photoresist, on the recording plane RP is then used to record the corresponding intensity fluctuations or speckle pattern. A magnified image of a speckle pattern made using this method is shown in FIG. 11.

The diameter e in the order of one-tenth of a micrometer of the smallest speckle grains achievable by this method is given by Collier, R. J., Burkhardt, C. B., and Lin, L. H., Optical Holography (San Diego, Calif.: Academic Press) Ch. 12. (1971):

$$\varepsilon = \frac{\lambda}{\alpha} \quad (\alpha = r/d) \tag{1}$$

where r represents the radius of the diffusing aperture, in this case circular, and d, the distance between the plane of the aperture and the recording plane. In real terms, the resolution of the photographic recording medium and the chemical processing of the recording obviously play an important role in the appearance of the final image.

Figure 12:
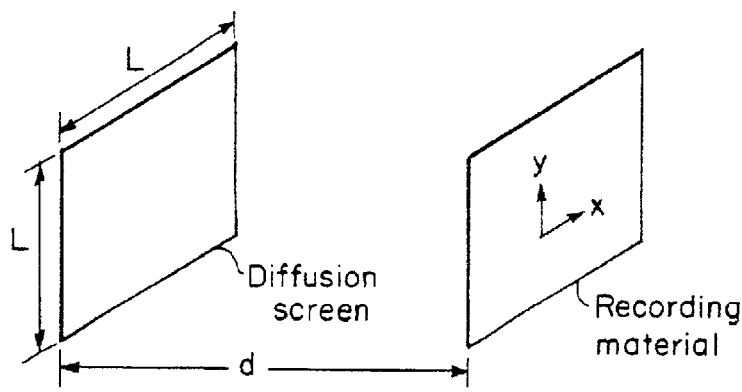
FIG. 12 is a schematic illustrating the geometry relating to the mean speckle size of the pattern of FIG. 11.

A point to note here is that the shape of the aperture may be manipulated to generate speckle features of unequal dimensions. To see how this might be achieved, we recall the expression for the minimum size of speckle grains recorded on a photographic plate for a given recording geometry:

$$\varepsilon_x = \varepsilon_y = \frac{2\lambda d}{L} \tag{2}$$

where L is the length of side of a square aperture and $\lambda$ is the wavelength of the coherent light in air (FIG. 12). If one wishes to record asymmetric patterns, then one can use a rectangular diffuser of sides $L_x$ and $L_y$ to create speckle dimensions given roughly by:

$$\varepsilon_x = \frac{2\lambda d}{L_x} \text{ and } \varepsilon_y = \frac{2\lambda d}{L_y} \tag{3}$$

Speckle features produced in this manner may be utilized in the same way as regular arrays to affect the performance of the corner-cube array but invoke an asymmetry into the distribution of the retroreflected light. For example, if one chooses $\varepsilon_x < \varepsilon_y$, then a greater spread of light in the x plane is produced than in the orthogonal y plane.

There are many drawbacks to recording speckle patterns in the foregoing manner. The first is the fact that it is unlikely that the light incident at the diffusion screen, and hence the photographic plate, is of uniform intensity. Although anti-Gaussian filters can be used, their positioning in the beam has to be precise to achieve true uniformity of the illuminating beam. Furthermore, the production of large scale screens up to 1.0 m diagonal is made awkward and time consuming.

Perhaps the biggest problem associated with this method of recording speckle patterns is the very poor efficiency of the system. Even in the most efficient system, only 10% of the light incident at the diffusion screen would reach the recording plane.

To eliminate these problems we have developed an alternate method by which scanning can be employed to produce uniform large scale speckle patterns.

Figure 13:
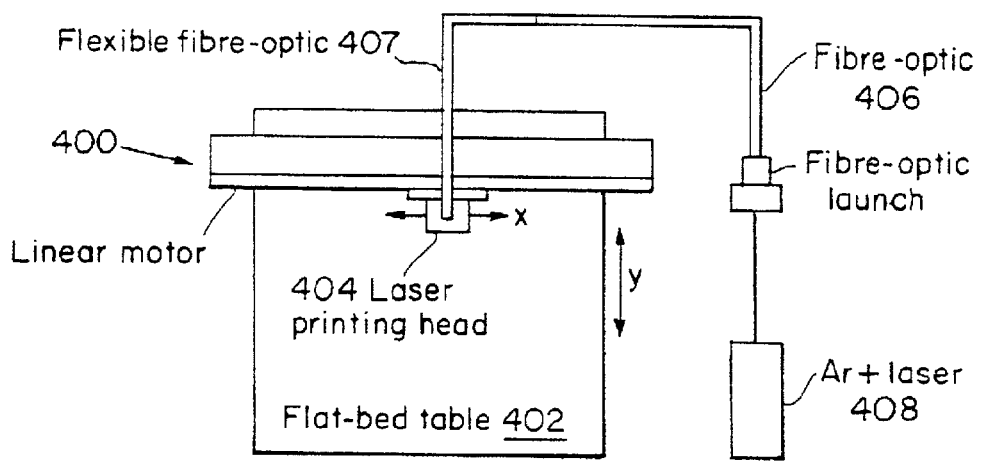
FIG. 13 is a schematic illustrating an alternate speckle scanning method.

Preferably, the scanning apparatus is comprised of an Anorad, Anomatic III™ CNC Positioning Controller System 400 (FIG. 13) which consists of a 0.6 m×0.6 m screw-driven flat-bed table 402, above which is supported a linear motor-driven laser printing head 404. The position of the printing head above the table relative to a fixed fiducial reference point is controlled by an external computer system (not shown). The printing head assembly supports the exit terminal of an optical fiber 406 which is fed remotely by an argon-ion laser 408. The exit terminal of the fiber is equipped with a converging lens so that the light incident at the surface of a photo-graphic plate placed on the table can be considered as being collimated and having a beam diameter of about 1.0 mm.

Figure 14:
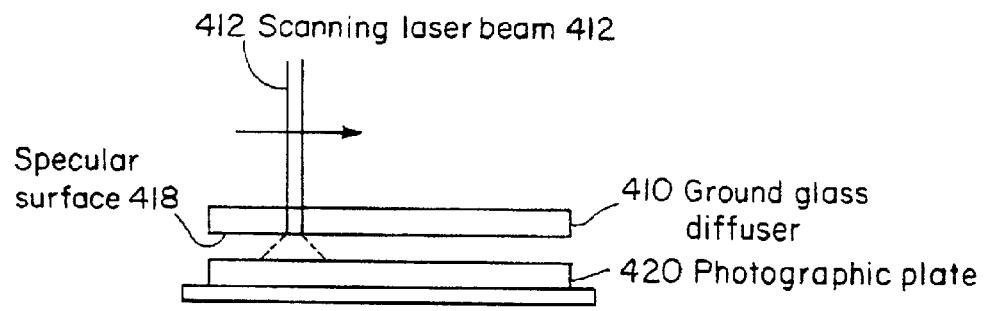
FIG. 14 is a more detailed view of the method of FIG. 13.
Figure 15:
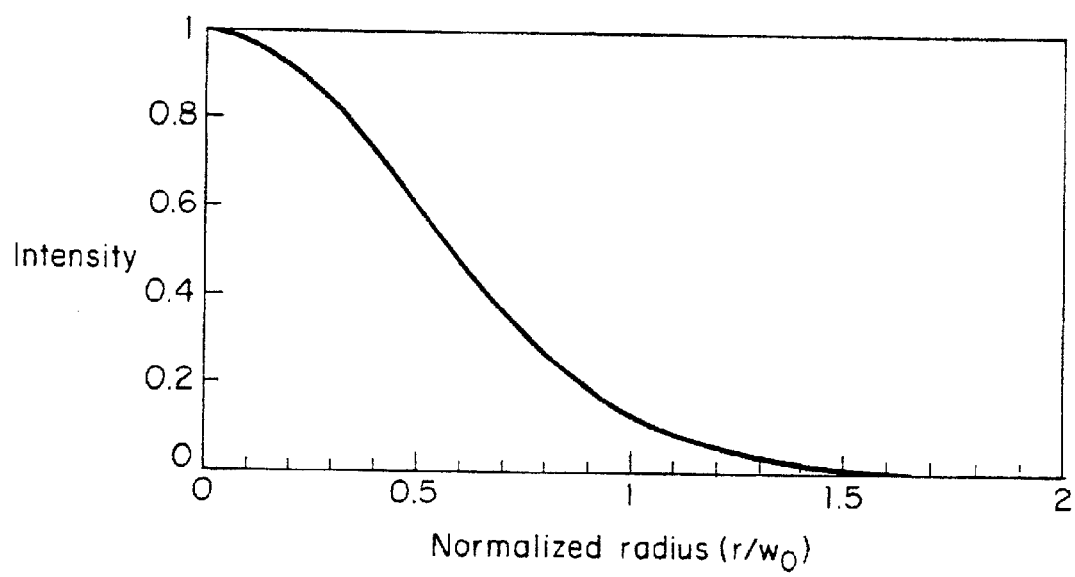
FIG. 15 is a plot of beam intensity versus normalized radius ($r/w_0$) of a speckle pattern using the scanning method of FIG. 13.

To record a speckle pattern a sheet of photographic material 420 is secured, emulsion up, to the flat-bed table of the system 400 (FIG. 14). Suspended above the photographic plate is a plate 410 of ground glass with the diffuse surface 418 facing the photographic plate below. The plate is then scanned with a collimated laser beam 412 from optic 207. Beam 412 is about 1.0 mm in diameter and is scanned over the required area before being developed. In such an arrangement, the effective aperture of the illuminated area of the diffuser is equivalent to the diameter of the scanning beam, i.e., approximately 1.0 mm. This means that if the air gap between the ground glass plate and the photographic plate is set at about 4 mm, then the smallest recorded speckle grains will be roughly 8$\lambda$ in size.

It might be argued that such a method of recording speckle patterns should never work. Why, for instance, does the superposition at the recording plane of the infinite number of speckle fields generated by the laser beam as it passes over the plate from one point to another not contrive to cancel each other out? It is believed that the process owes much to the way in which the latent image is subsequently developed. Scanning at the fastest interpolative speed of 80 mm/s and laterally displacing the table by 0.4 mm between each scan (collimated beam diameter=1.0 mm), we have been able to replicate in silver halide materials similar speckle patterns to those generated by conventional methods.

To calculate the required beam power of the laser necessary to expose the photoresist when using such a scanning method, we must first consider the nature of the light output of the laser 408.

The TEM$_{00}$ light output of a laser has a Gaussian intensity distribution. This radially symmetric distribution has an electric field variation given by $$E(r) = E_0 \exp\left(-\frac{r^2}{w_0^2}\right) \tag{4}$$

The intensity distribution is also Gaussian:

$$I(r) = I_0 \exp\left(-\frac{2r^2}{w_0^2}\right) \tag{5}$$

The parameter $w_0$, usually called the Gaussian beam radius, is the radius at which the intensity of the beam has decreased to $1/e^2$ or 0.135 of its value on axis (FIG. 6).

The total power contained with a Gaussian beam is obtained by integrating the intensity distribution thus:

$$P(\infty) = \int_0^{2\pi} d\theta \int_0^\infty I(r) r \, dr \tag{6}$$

$$= 2\pi I_o \int_0^\infty \exp\left(-\frac{2r^2}{w_0^2}\right) r \, dr$$

$$= \frac{\pi w w_0^2}{2} I_0$$

Therefore, the axial intensity of the beam, $I_0$, is related to the total power of the beam, $P(\infty)$, by:

$$I_0 = \frac{2}{\pi w_0^2} P(\infty) \tag{7}$$

This expression is useful since $P(\infty)$ can be measured as the total power of the beam incident at the plate using a simple light meter.

Having determined the on-axis intensity of the beam, one can now calculate the exposure of a photographic plate generated by scanning the beam over the emulsion.

Consider a Gaussian beam scanning along the line y=0 and from x=∞ to x=−∞. Assume that the scanning velocity of the beam is v. The exposure of the emulsion at any point along the x-axis is, therefore, $$E_0 = \int_{-\infty}^{\infty} I dt = \int_{-\infty}^{\infty} I \frac{\partial t}{\partial x} dx \qquad (8)$$

$$= \frac{1}{v} I_0 \int_{-\infty}^{\infty} \exp\left(-\frac{2x^2}{w_0^2}\right) dx = I_0 \frac{w_0}{v} \sqrt{\frac{\pi}{2}}$$

Here E represents the exposure of the plate and not the disturbance of the electric field at that point as in Equation 4.

Substitution of Equation 7 into the above equation relates the exposure of a point on the line y=0 to the power of the beam:

$$E_0 = P(\infty) \left( \frac{1}{v w_0} \sqrt{\frac{2}{\pi}} \right) \qquad (9)$$

It should be intuitive that the exposure of a point on the emulsion lying on the line y=r, where r is a constant, is given by:

$$E(r) = E_0 \exp\left(-\frac{2r^2}{w_0^2}\right) \qquad (10)$$

Consider now a second exposure of the plate obtained by scanning the emulsion with the same Gaussian beam of light along the line y=k. The exposure of the plate at a point y=k. The exposure of the plate at a point y=k is now given by:

$$E(r) = E_o \exp\left(-\frac{2r^2}{w_0^2}\right) + E_0 \exp\left(-\frac{2(r-k)^2}{w_0^2}\right) \qquad (11)$$

The addition of two exposure values in this manner is acceptable provided one is recording into a linearly responsive medium.

To cover the area of the photograph requires further scans along the lines y=ak where a=2, 3, 4, 5, . . . N. The resultant exposure profile of the plate along the x-axis is then, $$E(r) = E_0 \sum_{a=O}^{a=N} \exp\left(-\frac{2(r-ak)^2}{w_0^2}\right) \qquad (12)$$

Figure 16:
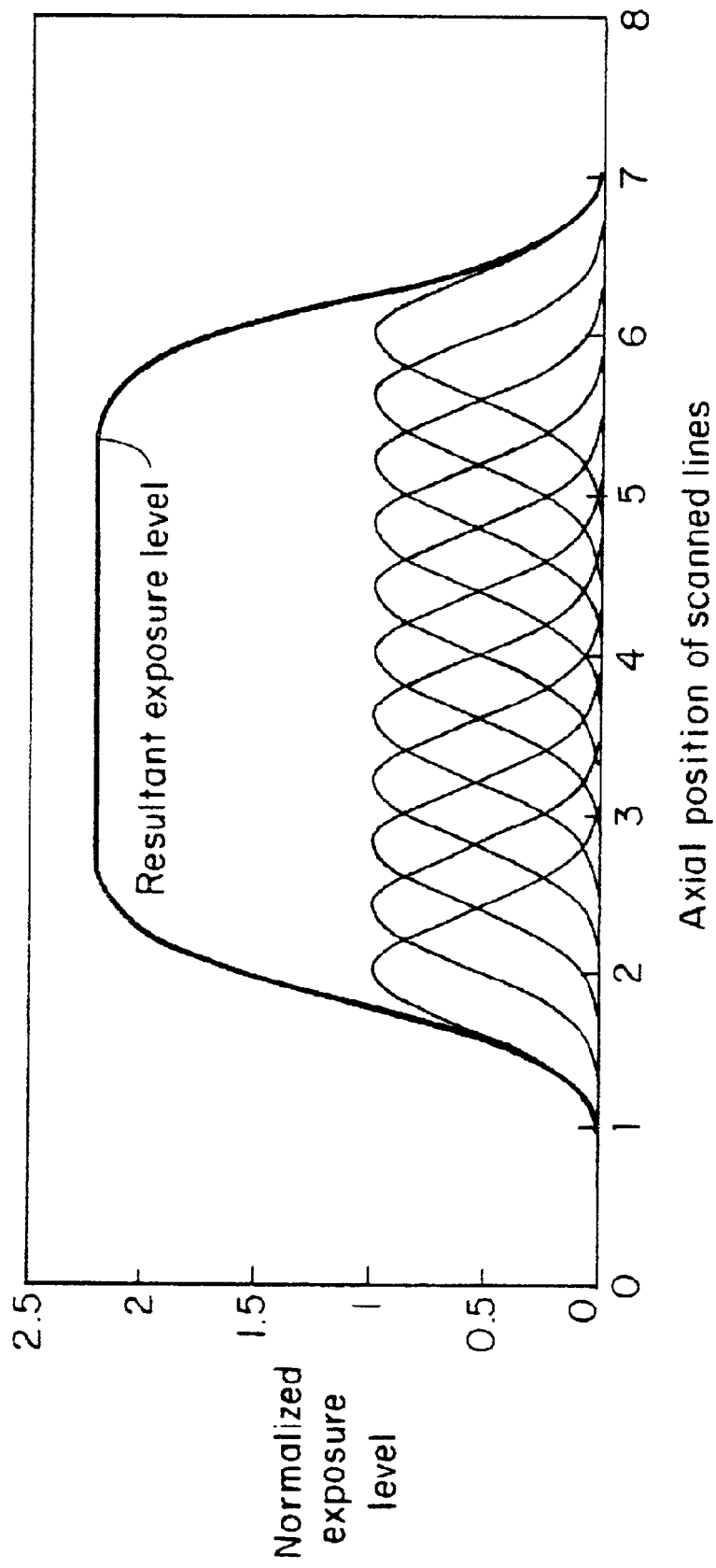
FIG. 16 is a plot of normalized exposure level versus axial position of scan lines showing the superposition of a number of Gaussian exposure profiles to create a uniform exposure level.

Here, N represents the number of scans necessary to provide adequate coverage of the plate. FIG. 16 shows the exposure profile of the plate along the y-axis for a total of 6 scans. In this instance we have chosen k=0.8$w_0$, to achieve a constant value for the exposure of the plate over a limited region. This constant value is equal to approximately 2.2$E_0$ and is achievable in this instance provided N>5. If we remember that we are exposing the photographic emulsion through a diffusion screen, then by assuming light losses due to reflection at the upper surface of the diffuser (approx. 4%) and absorption within the medium, then the value for the overall exposure of the plate is probably closer to 2$E_0$.

Therefore, by using a laser of power P(∞) and beam radius $w_0$ and by scanning a photographic plate through a diffuser at a speed v along consecutive lines separated by a distance 0.8$w_0$, the overall exposure of the plate is approximately equivalent to $$E = 2P(\infty)\left(\frac{1}{v w_0}\sqrt{\frac{2}{\pi}}\right) \qquad (13)$$

Values that relate to the preferred scanning system are $w_0$=0.5 mm and $v_{max}$=80 mm/s. Exposing the photoresist to an energy density of 200 mJ/cm² using an argon-ion laser operating at 458 nm would require an incident beam power of approximately 50 mW. Fortunately the use of such high beam powers can be avoided, but at the cost of reducing the scanning speed of the laser.

For our initial investigations into the recording of speckle patterns in resist, we used AZ-1350 coated chrome-on-glass plates from Hoya UK Ltd.

Figure 17:
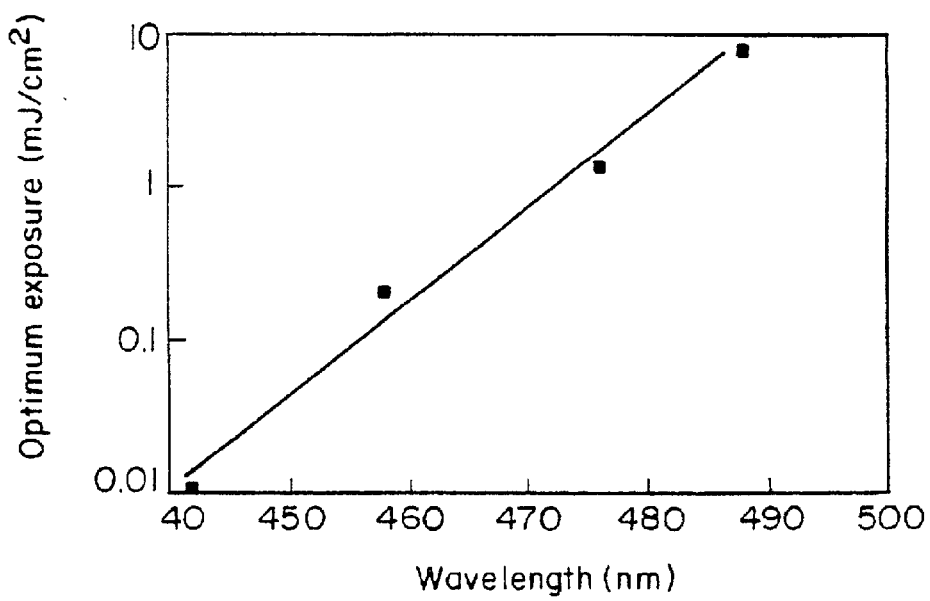
FIG. 17 is a plot of optimum exposure ($mJ/cm^2$) versus wavelength (nm) i.e., sensitivity curve for an AZ-1350 resist.

The spectral sensitivity curve for AZ-1350 resist shown in FIG. 17 demonstrates a characteristic common to all commercial resists. The important point to note about FIG. 17 is the rapid decrease in sensitivity of the resist with an increase in the wavelength of the actinic exposure. For example, at 441.6 nm the sensitivity of the resist is approximately 10 mJ/cm², whereas at 457.9 nm the spectral sensitivity is approximately 200 mJ/cm²—an increase of times 20. This kind of relationship between wavelength and photosensitivity is a peculiarity of resists. The increase in sensitivity that we have gained by adopting an argon-ion laser operating at 457.9 nm compared with an argon-ion laser operating at 488.0 nm is therefore appreciable. The resist layer used in our experiments was 500 mm thick and development was for 2 minutes using Shipley developer diluted with equal parts of water.

The developer solution used to process the plates featured in FIG. 17 is quite strong. In our preliminary tests we have used exposures in the region of 600 mJ/cm² at 488 nm and developed in a solution of one part developer (Shipley Microposit 303) to six parts distilled water. This is done to improve the contrast of the final recording which is seen as desirable. Unfortunately, with the laser power at the surface of the plate set at 15 mW, this requires that the plate be scanned at the slow speed of only 8 mm/s. In production this speed could be increased to 160 mm/s if one were to use a helium-cadmium laser operating at 441.6 nm.

Figure 18:
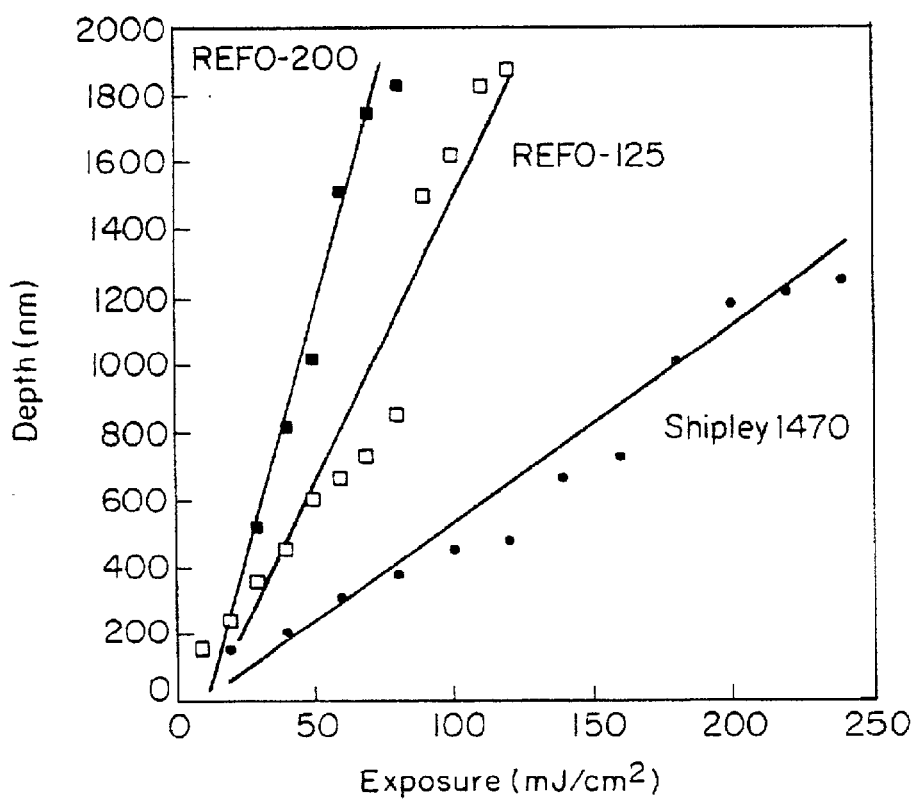
FIG. 18 is a plot of depth (mm) versus exposure ($mJ/cm^2$) for various resists, illustrating the dependence of etch depth on exposure.
Figure 19C:
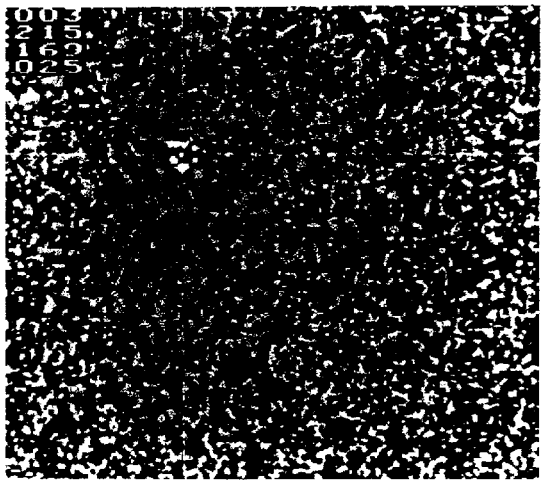
Figure 19D:
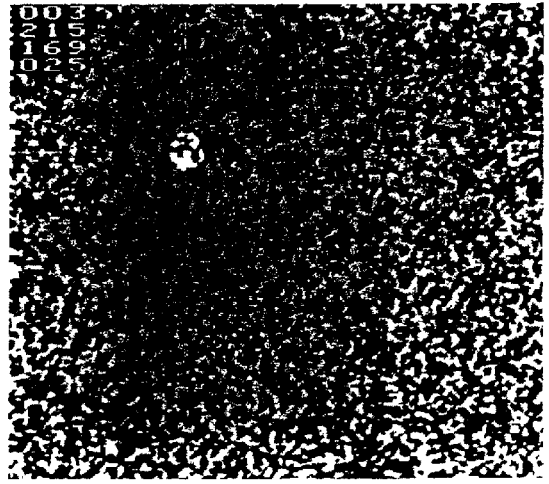
Figure 19E:
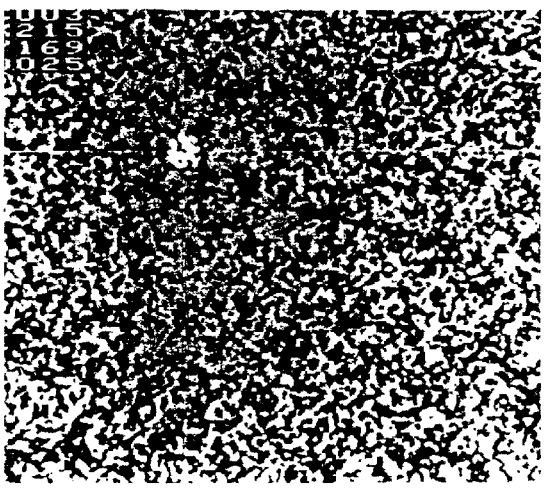
Figure 19F:
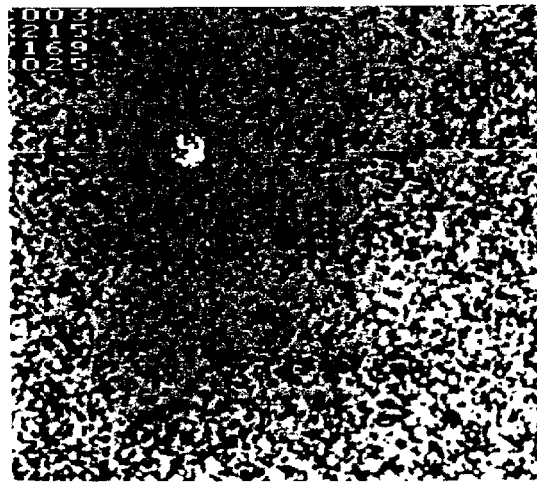

In comparison FIG. 18 shows the relative speed of REFO-125 and REFO-200 resists compared with Shipley 1470 resist when exposed to 457.9 nm irradiation. (Shipley 1470 resist is more sensitive than AZ-1350 resist at 457.9 nm). Both REFO resists have been developed at HSM Holographic Systems Müinech in Germany. The REFO resists have resolution capabilities similar to AZ-1350 resist with the added advantage of a greater sensitivity to the 458 nm line of an argon-ion laser and are a preferred choice of resist in which to dip-coat the nickel tool prior to etching.

Experimentation with the exposure requirements of AZ-1350 resist indicates that the appearance of the generated speckle pattern is very sensitive to small variations in exposure density. See FIG. 19 which shows how exposure influences the speckle recording in photoresist. Actinic wavelength=488 nm. Development for one minute in Shipley Microposit 303 developer diluted with five parts water. Diamer of superimposed circle=25 μm≡0.001". Assuming that the intensity variation over a plate should not exceed ±2%, then to record a speckle pattern on a 3" square plate using conventional techniques and without an anti-Gaussian filter would require that a laser beam having a 1.0 mm beam diameter would have to be expanded by almost 1000 times to ensure uniform coverage of the plate. It becomes clear then that to approach the uniform recording of a speckle pattern over areas as large as 10" square will require use of a scanning method.

Referring back to FIG. 9, the prisms 10' in this case, cube-corner elements 10' project from a first side of body portion 220. The cube-corner elements 10' comprise a light transmissible polymeric material, and the body layer 221 also comprises a light transmissible polymeric material. Light enters the cube-corner sheeting 200 through the front surface thereof.

In a preferred construction, the cube-corner element 10' and land layer 223 are made from similar or the same kind of polymers, and the land layer 223 is kept to a minimal thickness. The land layer 223, typically, has a thickness in the range of about 1.0 to 3.0 microns, and preferably in the range of approximately about 2.0 to 2.5 microns. Body layer 221 typically has a thickness of approximately 300 to 20 microns, and preferably in the range of about 150 to 50 microns. Although it is preferred to keep the land layer to a minimum thickness, it is desired that the sheeting 200 possess some land layer 223 so that a flat interface can be provided between the land layer 223 and the body layer 221. The cube-corner elements 10' typically have a height in the range of about 250 to 5 microns, and more typically in the range of about 75 to 25 microns. Although the embodiment of the invention shown in FIG. 9 has a single body layer 221, it is within the scope of the present invention to provide more than one body layer 221 in the body portion 220.

As previously noted, a specular reflective coating such as a metallic coating 222 can be placed on the backside of the cube-corner elements 10 to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating and to prevent oxidation of the metallic coating by oxygen present in the prism material. In addition to or in lieu of a metallic coating, a seal film can be applied to the backside of the cube-corner elements; see, for example, U.S. Pat. Nos. 4,025,159 and 5,117,304. The sealing film maintains an air interface at the backside of the prisms 10' to enhance retroreflectivity. A backing or an adhesive layer also can be disposed behind the cube-corner elements to enable the cube-corner retroreflective sheeting 200 to be secured to a substrate or backing layer 226.

The polymeric materials that comprise the retroreflective sheeting of the invention are light transmissible. This means that the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent.

The polymeric materials that are employed in the cube-corner elements tend to be hard and rigid. The polymeric materials may be thermoplastic or crosslinkable resins. The elastic modulus of these polymers preferably is greater than $18 \times 10^8$ pascals, and more preferably is greater than $20 \times 10^8$ pascals.

The facet side is then applied to a substrate or backing sheet 226 and bonded thereto by a suitable adhesive 228.

The materials used to manufacture flexible articles 100 have indices of refraction which are preferably from 1.4 to 1.7. The thickness of the cube corner prism material is preferably a minimum of 0.0002 inches thick and a maximum of 0.004 inches thick. The total thickness of the articles is determined by the protective and bonding layers used to manufacture the finished article. The groove angles are preferably about 64.5° and 73.4° respectively.

The microprism sheeting 200 is conveniently formed by casting prisms upon a film surface functioning as the body, or by embossing a preformed sheeting, or by casting both body and prisms concurrently. Generally, the resins employed for such cast microprism sheeting are cross-linkable thermoplastic formulations, and desirably these resins provide flexibility, light stability and good weathering characteristics. In some instances, the front face of the retroreflective sheeting may be provided with a protective coating such as by application of a lacquer or other coating material. Other suitable resins for the retroreflective sheeting include vinyl chloride polymers, polyesters, polycarbonates, methyl methacrylate polymers, polyurethanes and acrylated urethanes.

To protect a relatively thin body member during processing, a relatively thick carrier may be temporarily bonded thereto, and it will generally have a thickness of 0.001–0.004 inch. The adhesive used to effect the temporary bonding therebetween and which preferentially adheres to the carrier is conveniently a silicone adhesive applied to a thickness of about 0.00025–0.0005 inch. When ultraviolet curing of the resin in the prisms is employed, the adhesive must be transparent to the light rays. Although various resins may be employed for such a carrier, polyesters, and particularly polyethylene terephthalate, are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

A particularly advantageous method for making such cast retroreflective sheeting is described and claimed in Rowland U.S. Pat. No. 3,689,346 granted Sep. 5, 1972 in which the cube corner formations are cast in a cooperatively configured mold providing microprism recesses and are bonded to sheeting which is applied thereover to provide a composite structure in which the cube corner formations project from the one surface of the sheeting.

Another method for fabricating such microprism sheeting is described in Rowland U.S. Pat. No. 4,244,683 granted Jan. 13, 1981 in which the cube corner formations are produced by embossing a length of sheeting in suitable embossing apparatus with molds having precisely formed microprism cavities and in a manner which effectively avoids entrapment of air.

The latter method has been used for forming sheeting of acrylic and polycarbonate resins which the former method has proven highly advantageous for forming retroreflective sheeting from polyvinyl chloride resins and, more recently, polyester body members with prisms of various resin formulations including acrylated epoxy oligomers.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluororide); polyamides such as poly(caprolactam), poly (amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly (phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Additional materials suitable for forming the cube-corner elements are reactive resin systems capable of being crosslinked by a free radical polymerization mechanism by exposure to actinic radiation; for example, electron beam, ultraviolet light, or visible light. Additionally, these materials may be polymerized by thermal means with the addition of a thermal initiator such as benzoyl peroxide. Radiation-initiated cationically polymerizable resins also may be used.

Reactive resins suitable for forming the cube-corner elements may be blends of photoinitiator and at least one compound bearing an acrylate group. Preferably the resin blend contains a difunctional or polyfunctional compound to ensure formation of a crosslinked polymeric network upon irradiation.

Examples of resins that are capable of being polymerized by a free radical mechanism include acrylic-based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies and mixtures and combinations thereof. The term acrylate is used here to encompass both acrylates and methacrylates. U.S. Pat. No. 4,576,850 to Martens (disclosure incorporated here by reference) discloses examples of crosslinked resins that may be used in the cube-corner elements of the present invention.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofunctional compounds: ethylacrylate, n-butylacrylate, isobutylacrylate, 2-ethylhexylacrylate, n-hexylacrylate, n-octylacrylate, isobornyl acrylate, tetrahydrofurfuryl acrylate, 2-phenoxyethyl acrylate, N,N-dimethylacrylamide;

(2) Difunctional compounds: 1,4-butanediol diacrylate, 1,6-hexanediol diacrylate, neopentylglycol diacrylate, ethylene glycol diacrylate, triethyleneglycol diacrylate, and tetraethylene glycol diacrylate;

(3) Polyfunctional compounds: trimethylolpropane triacrylate, glyceroltriacrylate, pentaerythritol triacrylate, pentaerythritol tetraacrylate, and tris(2-acryloyloxyethyl) isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Examples of photopolymerization initiators which can be blended with the acrylic compounds include the following illustrative initiators; benzyl, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzyl methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4-(methylthio)phenyl-2-morpholion-1-propanone, et cetera. These compounds may be used individually or in combination.

Cationically polymerizable materials include but are not limited to materials containing epoxy and vinyl ethers functional groups. These systems are photoinitiated by onium salt initiators such as triarylsulfonium, and diaryliodonium salts.

Preferred polymers for the cube-corner elements include poly(carbonate), poly(methylmethacrylate), poly(ethyleneterephthalate), and crosslinked acrylates such as multi-functional acrylates or epoxies and acrylated urethanes blended with mono- and multi-functional monomers. These polymers are preferred for one or more of the following reasons: thermal stability, environmental stability, clarity, excellent release from the tooling or mold, and capable of receiving a reflective coating.

The polymeric materials employed in the land layer, as indicated above, may be the same as the polymers that are employed in the cube-corner elements, provided that the land layer is kept to a minimal thickness. A good interface prevents spreading of retroreflective light from refraction. In most instances, the land layer is integral with the cube-corner elements. By "integral" is meant the land and cubes are formed from a single polymeric material—not two different polymeric layers subsequently united together. The polymers that are employed in the cube-corner elements and land layer can have refractive indices which are different from the body layer. Although the land layer desirably is made of a polymer similar to that of the cubes, the land layer also may be made from a softer polymer such as those used in the body layer.

The polymer preferably is such that the polymeric material retains its physical integrity at the temperatures at which it is applied to the cubes. The polymer desirably has a vicate softening temperature that is greater than 50° C. The linear mold shrinkage of the polymer desirably is less than 1 percent. Preferred polymeric materials used in the body layer are resistant to degradation by U-V light radiation so that the retroreflective sheeting can be used for long-term outdoor applications. Examples of polymers that may be employed in the body layer include:

fluorinated polymers such as: poly(chlorotrifluoroethylene), for example Kel-F800™ available from 3M, St. Paul, Minn.; poly(tetrafluoroethylene-co-hexafluoropropylene), for example Exac FEP™ available from Norton Performance, Brampton, Mass.; poly(tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.; ionomeric ethylene copolymers such as: poly(ethylene-co-methacrylic acid) with sodium or zinc ions such as Surlyn-8920™ and Surlyn-9910™ available from E. I. duPont Nemours, Wilmington, Del.;

low density polyethylenes such as: low density polyethylene; linear low density polyethylene; and very low density polyethylene;

plasticized vinyl halide polymers such as plasticized poly(vinylchloride);

polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)_n$— where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate and combinations of these diisocyanates, (2) polydiols such as polypentyleneadipate glycol, polytetramethylene ether glycol, polyethylene glycol, polycaprolactone diol, poly-1,2-butylene oxide glycol and combinations of these polydiols, and (3) chain extenders such as butanediol or hexanediol. Commercially available urethane polymers include: PN-04, or 3429 from Morton International Inc., Seabrook, N.H., or X-4107 from B. F. Goodrich Company, Cleveland, Ohio.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesion to the land layer, clarity and environmental stability.

In an embodiment that contains polycarbonate cube-corner elements and/or a polycarbonate land layer and a body layer that contains a polyethylene copolymer such as poly(ethylene-co-(meth)acrylic acid), poly(ethylene-co-vinylacetate) or ply(ethylene-co-acrylate), the interfacial adhesion between the body layer and the land layer or cube-corner elements can be improved by placing a thin tie-layer (not shown) therebetween. The tie-layer can be applied on the body layer before laminating the body layer to the land layer or to the cube-corner elements. The tie-layer can be applied as a thin coating using, for example: an aliphatic polyurethane in organic solution, for example Permuthane™ U26-248 solution, available from Permuthane Company, Peabody, Mass.; Q-thane™ QC-4820 available from K. J. Quinn and Co., Inc., Seabrook, N.H.; an aliphatic polyurethane waterborne dispersion, for example NeoRez™ R-940, R-9409, R-960, R-962, R-967 and R-972, available from ICI Resins US, Wilmington, Mass.; an acrylic polymer water borne dispersion, for example, NeoCryl™ A-601, A-612, A-614, A-621 and A-6092, available from ICI Resins US, Wilmington, Mass.; or an alkyl acrylate and aliphatic urethane copolymer water borne dispersion, for example NeoPac™ R-9000, available from ICI Resins US, Wilmington, Mass. In addition, an electrical discharge method, such as a corona or plasma treatment, can be used to further improve the adhesion of tie-layer to the body layer or the tie-layer to the land layer or to the cube-corner elements.

It is customary to provide a backing sheet 226 (FIG. 9) behind the microprisms 10 so as to protect them and to provide a smooth surface for application of the structure to support surfaces. To effect lamination of such a backing sheet to the retroreflective sheeting, adhesives and ultrasonic welding have generally been employed.

As previously described, the reflective interface for the prisms may be provided by a reflective coating 224 (FIG. 9). As is well known, the reflective interface may also be supplied by an air interface. In the preferred embodiment of the present invention, a reflective coating is provided upon the surfaces of at least some of the microprisms, and such reflective coatings have most commonly been vacuum metallized aluminum or other specular metal deposits, although metallic lacquers and other specular coating materials have also been used.

A colored coating material may be provided over some of the prisms to provide a daytime coloration. Such a material may be a colored lacquer applied to the surface of the sheeting, a colored adhesive, or any other colored deposit which will coat the prism surfaces. Conveniently, a colored adhesive is employed since this will enable bonding of the backing material thereto.

A retroreflective material utilizing some prisms which have reflective air interfaces and others which utilize a reflective coating offers some advantages and is described in detail in Martin U.S. Pat. No. 4,801,193 granted Jan. 31, 1989. If so desired, retroreflective sheeting may be produced by applying the backing material to a partially metallized materials so as to maintain the air interface in the uncoated areas.

To produce a sheeting which exhibits a daytime coloration, a colored coating may be applied over the entire area of a partially metallized surface so that it directly coats the unmetallized prisms. Thereafter, the backing material is applied. In an alternate colored embodiment using an air interface for retroreflection, a colored adhesive is applied in a pattern to the prism surface and to a depth greater than the height of the prisms. When the backing element is laminated thereto, it is spaced from the prisms by the adhesive and this provides an air interface about the uncoated prisms.

The backing material may be any suitable material. For flexibility, it is a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics may be employed as well as those of natural fibers such as cotton. Flame retardants may be incorporated in the adhesives as well as in the fabric or resin backing to impart flame retardance to the retroreflective material.

Although other metals may be used to provide a specular metal deposit including silver, rhodium, copper, tin, zinc and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member, and even the prisms. As an alternative to a dye and as an effective necessity in some resin systems, the colorations may be provided as a finely divided pigment which is well dispersed; however, some loss in retroreflectivity will occur as the result of refraction by pigment particles which are directly in the path of light rays.

Colorants, UV absorbers, light stabilizers, free radical scavengers or antioxidants, processing aids such as anti-blocking agents, releasing agents, lubricants and other additives may be added to the body portion or cubecorner elements. The particular colorant selected, of course, depends on the desired color of the sheeting. Colorants typically are added at about 0.01 to 0.5 weight percent. UV absorbers typically are added at about 0.5 to 2.0 weight percent. Examples of UV absorbers include derivatives of benzotriazole such as Tinuvin™ 327, 328, 900, 1130, Tinuvin-P™, available from Ciba-Geigy Corporation, Ardsley, N.Y.; chemical derivatives of benzophenone such as Uvinul™-M40, 408, D-50, available from BASF Corporation, Clifton, N.J.; Syntase™ 230, 800, 1200 available from Neville-Synthese Organics, Inc., Pittsburgh, Pa.; or chemical derivatives of diphenylacrylate such as Uvinul™-N35, 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, 770 and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, or MD-1024, or Irgafos™-168, available from the Ciba-Geigy Corp., Ardsley, N.Y. Small amount of other processing aids, typically no more than one weight percent of the polymer resins, may be added to improve the resin's processability. Useful processing aids include fatty acid esters, or fatty acid amides available from Glyco Inc., Norwalk, Conn., metallic stearates available from Henkel Corp., Hoboken, N.J., or Wax E™ available from Hoechst Celanese Corporation, Somerville, N.J.

Equivalents

Those skilled in the art will recognize, or be able to ascertain using no more than routine experimentation, many equivalents to specific embodiments of the invention described specifically herein. Such equivalents are intended to be encompassed in the scope of the following claims.

What is claimed is:

1. A method of forming retroreflective sheeting comprising:
    a) forming a mold by:
        (i) forming three sets of parallel grooves in a body of mold material; the grooves intersecting at an angle to form a plurality of prisms each prism having a base and three intersecting lateral faces which meet at an apex;
        (ii) removing a portion of at least one face of a prism to form a shorter size prism adjacent a taller size prism and a cut surface therebetween;
    b) texturing some, but not all, of the surfaces of the faces and cut surface;
    c) forming a replica of the mold;
    d) forming the sheeting in the replica; and
    e) removing the sheeting from the mold.

2. The method of claim 1 wherein the prisms are formed in pairs and wherein the prisms have a tilted optical axis.

3. The method of claim 1 wherein the step of removing the portion of at least one face of a prism comprises fly-cutting.

4. The method of claim 1 wherein the shorter size prism is formed to have a skewed optical axis.

5. Retroreflective sheeting formed by the method of claim 1.

6. The method of claim 1 further including the step of metallizing the sheeting on a prism face side.

7. A method of forming retroreflective sheeting comprising:
    a) forming a mold by forming three sets of parallel grooves in a body of mold material; the grooves intersecting at an angle to form a plurality of prisms, each prism having a base and three intersecting lateral faces which meet at an apex;
    b) texturing at least a portion, but not all portions, of the surfaces of the faces;
    c) forming a replica of the mold;
    d) forming the sheeting in the replica; and
    e) removing the sheeting from the replica.

8. The method of claim 7 wherein the step of texturing the surfaces of the faces comprises:
    a) coating the faces with a layer of photoresist;
    b) exposing the photoresist to a substantially random speckle pattern;
    c) developing the exposed photoresist and selectively removing the developed photoresist; and
    d) etching the mold in the areas of the speckled pattern.

9. The method of claim 8 wherein the random speckled pattern is formed by illuminating a diffusion screen with a plane wave of coherent light.

10. The method of claim 8 wherein the pattern is asymmetric.

11. The method of claim 9 wherein the coherent light is scanned across the diffusion screen.

12. The method of claim 11 wherein the light is scanned at a speed σ along consecutive lines separated by a distance $w_o$, wherein $\sigma_{max}$ is about 80 mm/s and $w_o$ is about 0.5 mm.

13. A method of forming a mold for use in forming retroreflective sheeting comprising:
    a) forming the mold by forming three sets of parallel grooves in a body of mold material, the grooves intersecting at an angle to form a plurality of prisms, each prism having a base and three intersecting lateral fences which meet at an apex;
    b) coating at least a portion of the lateal faces with photoresist;
    c) exposing the photoresist to a substantially random speckle pattern;
    d) developing the exposed photoresist and selectively removing the developed photoresist;
    e) etching the mold in the areas of the speckle pattern; and
    f) removing a portion of at least one face of a prism to form a shorter prism adjacent a taller size prism and a cut surface therebetween.

14. The method of claim 13 further comprising forming a replica of the mold.

15. The method of claim 14 further comprising forming the sheeting in the replica.

16. The method of claim 15 further comprising removing the sheeting from the replica.

* * * * *